(No Model.)

G. LUDWIG.
VEHICLE.

No. 605,887. Patented June 21, 1898.

WITNESSES:
L. Douville
P. F. Seagle

INVENTOR
Gustav Ludwig
BY John A. Wiedersheim
ATTORNEY.

UNITED STATES PATENT OFFICE.

GUSTAV LUDWIG, OF BELLEVILLE, ILLINOIS.

VEHICLE.

SPECIFICATION forming part of Letters Patent No. 605,887, dated June 21, 1898.

Application filed January 16, 1897. Serial No. 619,403. (No model.)

*To all whom it may concern:*

Be it known that I, GUSTAV LUDWIG, a citizen of the United States, residing at Belleville, in the county of St. Clair, State of Illinois, have invented a new and useful Improvement in Vehicles, which improvement is fully set forth in the following specification and accompanying drawings.

My invention relates to a vehicle which may be made open or closed, according to requirements; and it consists in providing the body of the same with doors formed in sections, which may be folded together and placed laterally outside of said body, so that the front of the latter is unobstructed by said folded doors, the thills being also formed so that the front axle can be turned to the right and left for steering purposes, in which case said thills pass freely under the folded doors without being obstructed by the same.

Figure 1:
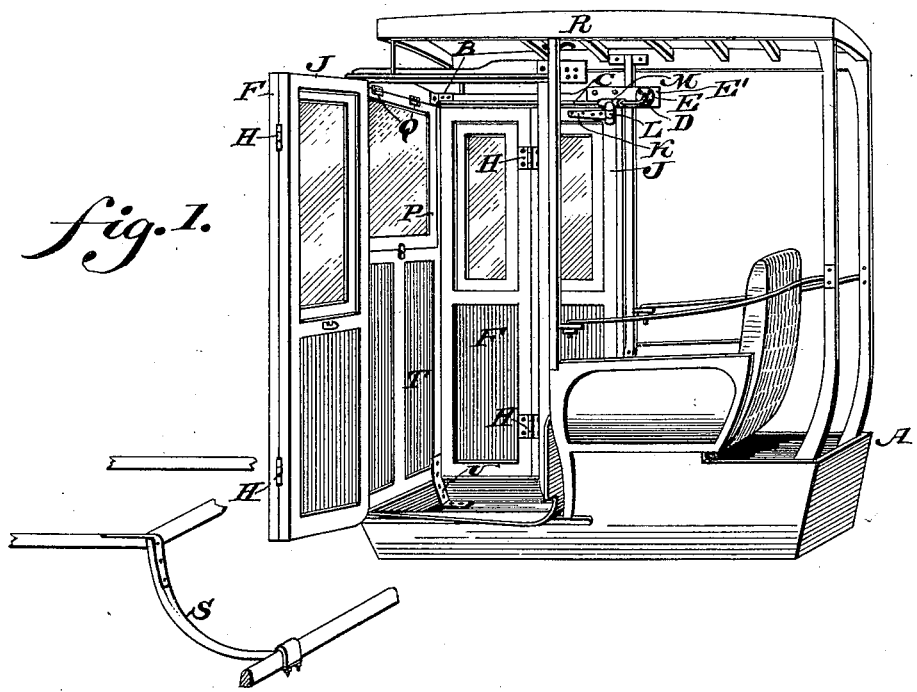
Figure 2:
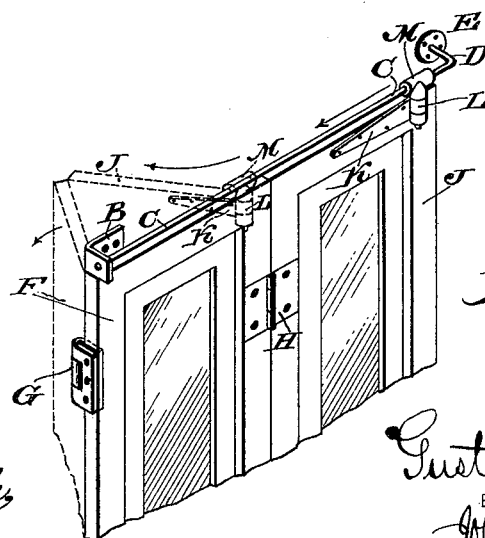

Figure 1 represents a perspective view of a transformable vehicle embodying my invention. Fig. 2 represents a detached perspective view of a plurality of doors employed, showing also the preferred manner of supporting the same.

Similar letters of reference indicate corresponding parts in the two figures.

Referring to the drawings, A designates the body of the vehicle, the rear thereof being provided with sides or coverings of any suitable material, while the forward end thereof is provided with the novel devices constituting my invention, which can be entirely removed when desired.

B designates a bracket or hanger which is suitably supported in each forward corner of the vehicle, said bracket serving to support a longitudinally-extending rod C, the other extremity of which is deflected at D and in the present instance attached to a plate E, which latter is secured to a strip E', which is removably supported in any suitable manner on the vehicle, although it will of course be evident that the rod C can be supported in other means than that shown.

It will be evident that the construction and arrangement of the rods and their adjuncts is the same for each side of the vehicle, and a description of one will therefore suffice for both.

F designates a door which is hinged at its "forward" portion, by which is meant that portion nearest the dashboard, to an upright post or support by means of the hinges G, said door F having hinged thereto by means of the hinges H a rear door J, said hinges H being on the inner side of said doors F and J, the door J having attached to its upper rear or right-hand portion the hinge K. The pintle of the knuckle L of said hinge K is attached to the sleeve M, which latter slides on the rod C, it being not deemed necessary to illustrate further the manner of attaching the hinge K to the sleeve M, since any device which will permit a duplex movement to be given to the door J may be employed—that is, a movement which permits the door J to move forwardly and at the same time outwardly by reason of the hinges H.

P designates a front window frame or sash which is supported in the upper portion of the front end of the wagon above the front panel T, said frame P being hinged at Q to a suitable portion of the vehicle and being adapted to be supported by means of the hook R when it is desired to hold said frame in open position, said hook being available to support the reins thereon, if desired.

S designates the preferred shape to be given to the thills at or near their point of junction with the front axles, said thills being depressed in the manner indicated in dotted lines in Fig. 1, so that the doors F and J in their open position do not interfere therewith in the turning of the front axle to the right or left, in which case said depressed thills readily pass under the open doors. The sections of the door are not wide. Hence they may be moved between the front wheels and body of the vehicle without being obstructed by said wheels.

U designates a plate which holds the front panel in position, the bolts therefor also serving to hold the dash when replaced.

The operation is as follows when the vehicle is to be used in a closed condition: The parts in their normal positions appear as indicated in full lines in Fig. 2 and on the far side of Fig. 1, it being of course understood that the door J is supported by means of the connections common to it and the sleeve M in conjunction with the hinges H, whereby any liability of sagging of either of said doors is prevented.

When the parts are in the positions above indicated, the carriage appears as a closed carriage, and when it is desired to convert the same into an open vehicle the doors, front window, panel, and supporting parts may be entirely removed and stored until desired.

When the parts are in place, in order to enter or leave the vehicle it is only necessary to cause the doors to assume the position seen at the extreme left of Fig. 1 or in dotted lines in Fig. 2. This can be done by simply pushing the door J forwardly, the doors breaking outwardly, as indicated, the sleeve M sliding on the rod C and thus supporting said door J.

Attention is called to the fact that there is no liability of sagging of the rear door J either in its open or closed position, and when the doors are open they will not strike or interfere with the wheels or shafts.

Any suitable locking device which can be operated from the exterior or interior may be used on the doors.

It will of course be evident that changes may be made by those skilled in the art which will come within the scope of my invention, and I do not desire to be limited in every instance to the exact construction I have herein shown and described.

In the construction as shown the dash has been removed and can be replaced when changing the buggy to an open vehicle. It will be readily seen, however, that I can construct a vehicle covering my invention without of necessity removing the dash.

Having thus described my invention, what I claim as new, and desire to secure by Letters Patent, is—

1. In a convertible vehicle, a door hinged to the body thereof, another door hinged to said first-named door, an auxiliary hinge connected with the second-named door and with a sliding sleeve, and a support on the body on which said sleeve is mounted, said doors being adapted to be folded on each other and project from the body outside of the same.

2. In a convertible vehicle, a door adapted to be folded outside of the body thereof and formed in sections hinged together, one of said sections being hinged to said body, an auxiliary sliding hinge connected with the other section, a sleeve attached to said hinge and a support on said body, on which said sleeve is adapted to slide, in combination with thills which are depressed, so as to turn under said door when so folded outside of said body.

GUSTAV LUDWIG.

Witnesses:
W. F. KIRCHER,
A. VOLLRATH.